United States Patent Office 3,686,082
Patented Aug. 22, 1972

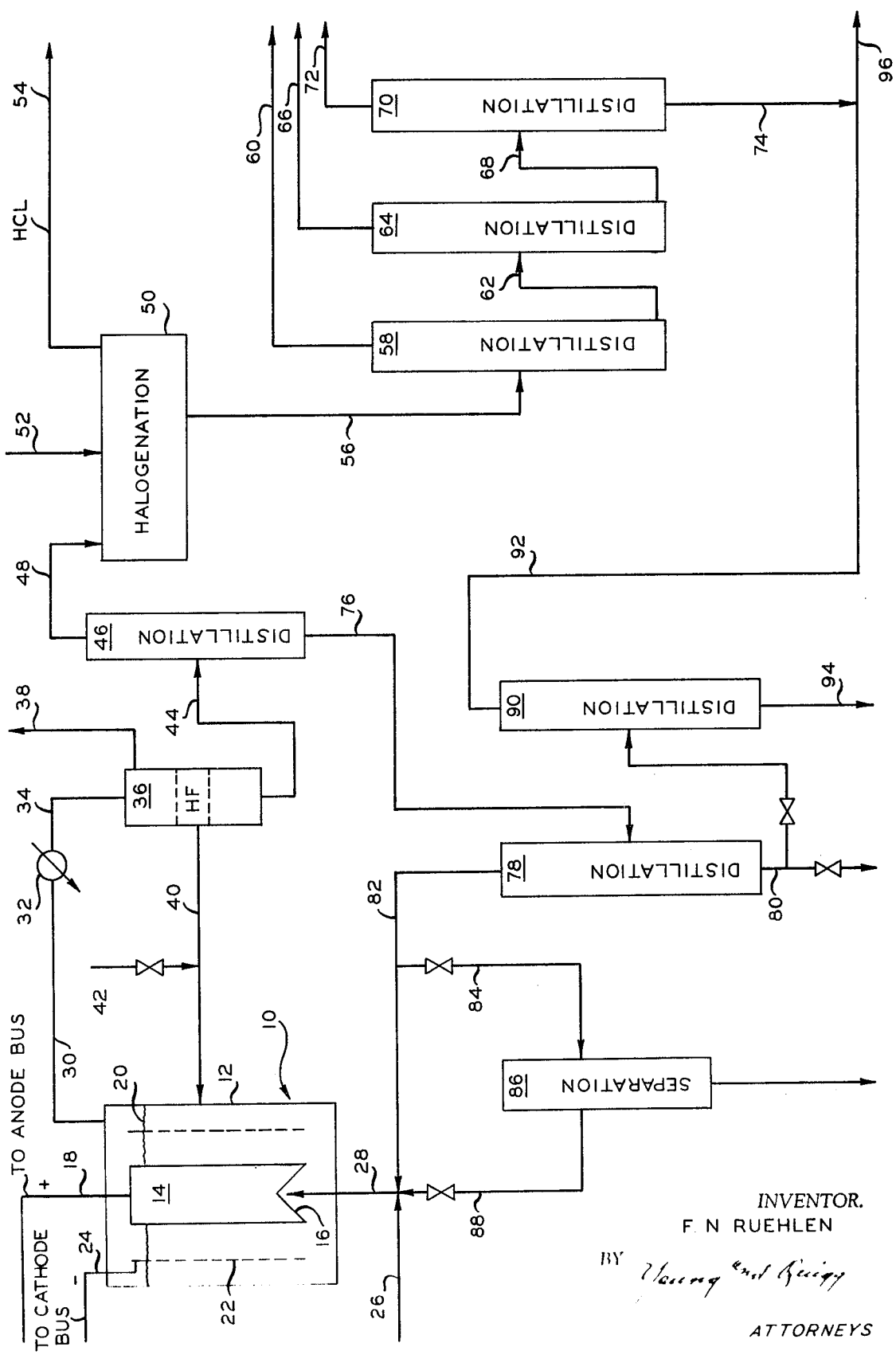

3,686,082
PROCESS FOR RECOVERY AND SEPARATION OF PERHALOGENATED FLUOROCARBONS
Forrest N. Ruehlen, Bartlesville, Okla., assignor to Phillips Petroleum Company
Filed Feb. 27, 1970, Ser. No. 15,118
Int. Cl. B01j 1/10; B01k 3/00; C07c 17/00
U.S. Cl. 204—59
9 Claims

ABSTRACT OF THE DISCLOSURE

Perhalogenated fluorocarbons, e.g., chlorofluorocarbons, contained in a mixture together with partially halogenated fluorohydrocarbons, e.g., chlorofluorohydrocarbons, are recovered and separated by halogenating, e.g., chlorinating, said partially halogenated fluorohydrocarbons to perhalogenated fluorocarbons so as to reduce the number of compounds present. The resultant mixture is then fractionated to separate the perhalogenated fluorocarbons.

This invention relates to the recovery and separation of perhalogenated fluorocarbons. In one aspect this invention relates to the recovery and separation of perhalogenated fluorocarbons, e.g., chlorofluorocarbons, produced by fluorinating halogenated hydrocarbons, e.g., chlorinated hydrocarbons.

Herein and in the claims, unless otherwise specified, the term "perhalogenated fluorocarbons" refers to compounds which contain only fluorine, carbon, and another halogen other than fluorine, e.g., chlorine; and the term "partially halogneated fluorohydrocarbons" or the term "halogenated fluorohydrocarbons" refers to compounds which contain only fluorine, carbon, hydrogen, and another halogen other than fluorine, e.g., chlorine. For convenience, the invention will be described herein with particular reference to perhalogenated fluorocarbons and halogenated fluorohydrocarbons wherein chlorine is the halogen present other than fluorine, for example, chlorofluorocarbons and chlorofluorohydrocarbons, respectively. However, the invention is not so limited. Said other halogen can also be bromine or iodine.

The invention is applicable to mixtures of perhalogenated fluorocarbons and halogenated fluorohydrocarbons obtained from any source. Said mixtures are commonly obtained in processess for fluorinating halogenated hydrocarbons, e.g., chlorinated hydrocarbons. One such process comprises direct fluorination using element fluorine. Another fluorination process comprises using cobalt trifluoride. However, in recent years more practical electrochemical fluorination processes have been developed. The invention is particularly applicable to product mixtures obtained in electrochemical fluorination processes.

Due to the reactivity of the fluorine and the other halogen present, e.g., chlorine, a considerable variety of products is produced in said fluorination processes. Thus, a problem common to all of said fluorination processes is the separation of the products obtained therein. This problem is aggravated by the fact that in many instances the boiling points of some of said products are close, making separation by fractional distillation difficult.

The present invention provides a solution for the above-described problems. I have now discovered that chlorofluorocarbons contained in a mixture of same together with chlorofluorohydrocarbons can be recovered and separated by chlorinating said chlorofluorohydrocarbons to chlorofluorocarbons so as to reduce the number of compounds present in the mixture, and then fractionating the resultant mixture to separate the chlorofluorocarbon compounds.

An object of this invention is to provide a method for the recovery of, and the separation of, per halogenated fluorocarbon compounds present in mixtures containing the same together with halogenated fluorohydrocarbon compounds. Another object of this invention is to provide an improved electrochemical fluorination process. Still another object of this invention is to provide an improved process for the electrochemical fluorination of 1,2-dichloroethane and the recovery of the products produced in said process. Other aspects, objects, and advantages of the invention will be apparent to those skilled in the art in view of this disclosure.

Thus, according to the invention, there is provided a process for the recovery of, and the separation of, perhalogenated fluorocarbon compounds containing a halogen other than fluorine present in a mixture with partially halogenated fluorohydrocarbon compounds which also contain said other halogen and at least some of which are capable of being halogenated to said perhalogenated fluorocarbon compounds, which process comprises: passing said mixture to a halogenation zone; in said halogenation zone, halogenating said partially halogenated fluorohydrocarbon compounds to perhalogenated fluorocarbon compounds so as to reduce the number of compounds present in said mixture; and fractionating the resulting mixture to separate and recover said perhalogenated fluorocarbon compounds.

Further according to the invention, there is provided, in a process for the fluorination of a halogenated hydrocarbon feedstock wherein there is produced a mixture of perhalogenated fluorocarbon compounds containing a halogen other than fluorine and partially halogenated fluorohydrocarbon compounds also containing said halogen other than fluorine, and wherein said perhalogenated fluorocarbons are recovered from said mixture, the improvement comprising: passing at least a portion of said mixture to a halogenation zone; in said halogenation zone, halogenating said partially halogenated fluorohydrocarbons with said halogen other than fluorine to convert same to perhalogenated fluorocarbon compounds so as to reduce the number of compounds present in said mixture; and fractionating an effluent stream from said halogenation zone to separate and recover said halogenated fluorocarbon compounds.

A number of advantages are obtained or realized in the practice of the invention. One important advantage is that the recovery and separation of perhalogenated fluorocarbons is facilitated. Another important advantage is that in electrochemical fluorination processes the production of undesired products can be decreased and the production of desired products increased. Another important advantage is that more efficient electrochemical fluorination is obtained by eliminating undesirable components from the stream or streams recycled to the electrochemical fluorination cell. This provides the additional advantage of increased flexibility in the electrochemical fluorination process in that operating parameters can be more readily adjusted to vary the ratio of desired products. Said advantages are illustrated further hereinafter in connection with the example.

The invention is applicable to the product mixtures obtained from any electrochemical fluorination process wherein a halogenated hydrocarbon containing a halogen other than fluorine is fluorinated. Thus, the invention is applicable to electrochemical fluorination processes wherein the feedstock is dissolved in the electrolyte. The invention is also applicable to electrochemical fluorination processes wherein the feedstock is bubbled into the electrolyte through a porous anode. In a presently preferred electrochemical fluorination process, to which the invention is particularly applicable, a current-conducting essentially anhydrous liquid hydrogen fluoride electrolyte is electrolyzed in an electrolysis cell provided with a cathode and a nonwetting porous anode (preferably porous carbon), and the feedstock is introduced into the pores of said anode and fluorinated within said pores.

Briefly, said preferred electrochemical fluorination process comprises passing the feedstock to be fluorinated into the pores of a nonwetting porous anode, e.g., porous carbon, disposed in a current-conducting essentially anhydrous hydrogen fluoride electrolyte such as $KF \cdot 2HF$. Said feedstock contacts the fluorinating species within the pores of the anode and is therein at least partially fluorinated. Generally speaking, said fluorination can be carried out at temperatures within the range of from −80 to 500° C. at which the vapor pressure of the electrolyte is not excessive. A preferred temperature range is from about 60 to 120° C. Pressures substantially above or below atmospheric can be employed if desired. Generally speaking, the process is conveniently carried out at substantially atmospheric pressures. The feedstock to be fluorinated is preferably introduced into the pores of the anode at a rate such that there is established a pressure balance within the pores of the anode between the feedstock entering the pores and electrolyte attempting to enter said pores from another and opposing direction. Said feedstock flow rate can be within the range of from 3 to 600 milliliters per minute per square centimeter of anode cross-sectional area, taken perpendicular to the direction of flow and expressed in terms of gaseous volume calculated at standard conditions. Current densities employed can be within the range of 30 to 1000, preferably 50 to 500, milliamps per square centimeter of anode geometric surface area. Typical cell voltages employed can range from 4 to 12 volts. Converted and unconverted products are withdrawn from the pores of the anode and the products recovered from a cell effluent stream.

Further details of said preferred electrochemical fluorination process can be found in copending application Ser. No. 683,089, filed Nov. 2, 1967, by H. M. Fox and F. N. Ruehlen, now Pat. No. 3,511,760.

The drawing is a diagrammatic flow sheet illustrating one presently preferred embodiment of the invention wherein a feedstock, e.g., 1,2-dichloroethane, is fluorinated and the products obtained are separated in accordance with the invention.

Referring now to the drawing, the invention will be more fully explained. In said drawing there is illustrated an electrolytic cell, denoted generally by the reference numeral 10, comprising a cell body 12 having an anode 14 disposed therein. As here illustrated, said anode in its simplest form comprises a cylinder of porous carbon having a cavity 16 formed in the bottom thereof. Any suitable anode can be employed in said cell. Examples of other suitable anodes can be found in copending application Ser. No. 680,123, filed Nov. 2, 1967, by W. V. Childs, now Pat. No. 3,511,762. A current collector 18, usually comprising a rod or hollow conduit of a metal such as copper, is provided in intimate contact with the upper portion of said anode 14 and is connected to the anode bus of the current supply. Preferably, the upper end of anode 14 extends above the electrolyte level 20. However, it is within the scope of the invention for the top of said anode to be below said electrolyte level. A circular cathode 22, which can be a screen formed of a suitable metal, such as carbon steel or stainless steel, surrounds said anode 14 and is connected to the cathode bus of the current supply by a suitable lead wire 24. Any suitable source of current and connections thereto can be employed.

In the operation of the system illustrated, a feedstock such as 1,2-dichloroethane is introduced into the cavity portion 16 of said anode via conduits 26 and 28, travels upward through the pores of said anode, and exits from the upper end of the anode above electrolyte level 20. During passage through said anode, at least a portion of the feedstock is electrochemically fluorinated. Fluorinated products together with remaining unconverted feedstock, hydrogen, and possibly some electrolyte vapors, are withdrawn from the space above the electrolyte within cell 12 via conduit 30. During the introduction of said feedstock an electric current in an amount sufficient to supply the desired operating current density at the anode is passed between the anode and the cathode. Preferably, the cell effluent stream in conduit 30 is passed into a cooler or condenser 32 wherein it is cooled to a temperature which is at least sufficient to condense the hydrogen fluoride and higher boiling cell products contained therein. Generally speaking, said condenser 32 preferably will be operated at a temperature within the range of from −150 to 50° C., depending upon the composition of stream 30. The pressure in condenser 32 will generally be within the range of 0 to 200 p.s.i.g., preferably 0 to 50 p.s.i.g. However, it is within the scope of the invention to operate said condenser at temperatures and pressures outside said ranges so long as said temperature and pressure are such that the hydrogen fluoride and higher boiling material contained in the cell effluent stream will be condensed.

Condensate and noncondensed gases from said condenser are passed via conduit 34 into first separation zone 36 wherein phase separations are effected between condensed hydrogen fluoride and other condensed effluent components including fluorinated products, unreacted feedstock, and noncondensed gases. Said noncondensed gases comprising hydrogen, and possibly some light ends such as fluorinated $C_1$ compounds, are withdrawn from separator 36 via conduit 38. The hydrogen fluoride phase is returned to cell 12 via conduit 40. Make-up hydrogen fluoride can be supplied to the system via conduit 42. As here illustrated, said first separation zone comprises a vessel wherein separation between the two liquid phases and a gaseous phase is effected by gravity settling. However, it is within the scope of the invention to employ other phase separation means or methods, e.g., centrifuging.

The lower organic phase in separator 36 is withdrawn therefrom via conduit 44 and introduced into first distillation zone 46. An overhead stream comprising, for example, fluorinated products boiling lower than about 48° C., is withdrawn overhead from said distillation zone 46 via conduit 48 and introduced into halogenation zone 50. Said halogenation zone can comprise any suitable process and apparatus known to the art for halogenating fluorinated hydrocarbons. For example, said halogenation zone can comprise means for halogenating the fluorohydrocarbons thermally by the methods disclosed in U.S. Pat. 2,644,845. Preferably, said halogenation zone will comprise means for photochemically halogenating said fluorohydrocarbons using ultraviolet light by methods well known in the art. Said photochemical processes are usually carried out by contacting the material to be halogenated with a halogen, e.g., chlorine, at a temperature within the range of from about −30 to 100° C. and a pressure sufficient to maintain the material being halogenated in liquid phase. However, any suitable reaction conditions, including vapor phase conditions, can be used in the practice of the invention. Said halogenation reaction is preferably carried to completion. Further details of photochemical halogenation processes can be found in U.S. Pats. 3,494,844; 3,402,114; 3,296,108; 3,019,175, and others. In some instances, it will be preferred to carry out the halogenation batchwise, or semibatchwise, so as to more conveniently effect the complete halogenation. However, it is within the scope of the invention to carry out said halogenation in a continuous manner, employing a plurality of stages and/or recycle within the halogenation zone so as to insure complete halogenation of the fluorohydrocarbons to chlorofluorocarbons. Halogen can be introduced into said halogenation zone via conduit 52. By-product hydrogen chloride is withdrawn from the halogenation zone via conduit 54.

A stream comprising perhalogenated fluorocarbons is withdrawn from halogenation zone 50 via conduit 56 and introduced into fractional distillation zone 58. When 1,2-dichloroethane is the feedstock to electrochemical fluorination cell 10, and chlorine is the halogen used in halogenation zone 50, the overhead stream from distillation zone 58 will comprise chloropentafluoroethane and some light ends and is withdrawn from zone 58 via conduit 60. Bottoms product is withdrawn from distillation 58 via conduit 62 and introduced into distillation zone 64. When 1,2-dichloroethane is the feedstock to cell 10, and chlorine is the halogen used in halogenation zone 50, the overhead product from distillation zone 64 will comprise 1,2-dichlorotetrafluoroethane and will be withdrawn therefrom via conduit 66. Bottoms product is withdrawn from distillation zone 64 via conduit 68 and introduced into distillation zone 70. When 1,2-dichloroethane is the feedstock to cell 10, and chlorine is the halogen used in halogenation zone 50, the overhead product from distillation zone 70 will comprise 1,1,2-trichloro-1,2,2-trifluoroethane and will be withdrawn therefrom via conduit 72. Bottoms product from said distillation zone 70 will comprise 1,1-difluorotetrachloroethane and will be withdrawn therefrom via conduit 74.

Returning to distillation zone 46, bottoms product will be withdrawn therefrom via conduit 76 and introduced into distillation zone 78. A heavy ends bottoms product comprising a small amount of dimers and other higher boiling materials formed in the electrochemical fluorination step is withdrawn from distillation zone 78 via conduit 80. An overhead stream comprising unreacted 1,2-dichloroethane feedstock and partially fluorinated products is withdrawn from distillation zone 78 via conduit 82 and introduced into conduit 28 for recycle to cell 10. Said overhead stream in conduit 82 will contain a small amount of 1,1-difluorotetrachloroethane, a perhalogenated material which boils at about the midpoint of the overall boiling range of the components contained in said overhead stream. Said difluorotetrachloroethane is an inert material which will not be further fluorinated upon recycle to cell 10. Said difluorotetrachloroethane is produced in small amounts and the concentration thereof in the system will increase. Periodically it will be desirable to withdraw a portion of the overhead stream in conduit 82 and pass same via conduit 84 into separation zone 86 wherein removal of said difluorotetrachloroethane is effected. Said separation zone 86 can comprise any suitable separation means such as fractional distillation and/or solvent extraction. After removal of said difluorotetrachloroethane the stream is returned via conduit 88 for recycle to cell 10.

When monochloromethane is the feedstock to the electrochemical fluorination cell 10, the operation of the system illustrated in the drawing is substantially like that described above. The principal differences are in the products withdrawn in the various streams. For example, the overhead in conduit 60 from distillation zone 58 will comprise tetrafluoromethane, the overhead in conduit 66 from distillation zone 64 will comprise chlorotrifluoromethane, the overhead in conduit 72 from distillation zone 70 will comprise dichlorodifluoromethane, and the bottoms product in conduit 74 from distillation zone 70 will comprise trichlorofluoromethane. The bottoms product from distillation zone 46 is withdrawn via conduit 76 and passed to distillation zone 78 from which an overhead stream comprising unreacted monochloromethane feedstock, monochloromonofluoromethane, and dichloromonofluoromethane is recycled to cell 10 via conduit 82. The bottoms product in conduit 80 withdrawn from distillation zone 78 is passed to distillation zone 90. The overhead in conduit 92 from distillation zone 90 comprises trichlorofluoromethane and is combined in conduit 96 with the stream from conduit 74. A bottoms product comprising a small amount of heavy end products is withdrawn from said distillation zone 90 via conduit 94.

The following example will serve to further illustrate the invention.

EXAMPLE I

In this illustrative embodiment a run is carried out for the electrochemical fluorination of 1,2-dichloroethane in a system embodying the essential features of the system illustrated in the drawing and using an electrolyte in cell 10 which has an approximate composition of KF·2HF. Porous carbon cylinders having cavities in the bottom thereof as illustrated diagrammatically for anode 14 are employed as anodes. Fresh 1,2-dichloroethane feedstock is introduced via conduits 26 and 28 into the pores of anode 14. The conversion in electrolytic cell 10 is carried out at an electrolyte temperature of about 95° C., employing a current density of about 250 amperes per square foot of anode geometric surface area, and a voltage of about 8 volts, D.C. Condenser 32 is operated at a temperature of about −60° C. The pressure in cell 10, condenser 32, and phase separator 36 is substantially atmospheric. A cell effluent stream is withdrawn via conduit 30 and processed as described above in connection with the drawing for the recovery of products therefrom, and the return of a recycle stream to the cell via conduits 82 and 28. Table I below sets forth the principal components in said cell effluent and said recycle streams, the charge and products from the chlorination step, and a material balance for the system.

TABLE I

| Component | Boiling point, °C. | Gram moles per hour | | | | | | | | |
|---|---|---|---|---|---|---|---|---|---|---|
| | | 26 | 42 | 82 | 40 | 44 | 76 | 48 | 38 | 52 |
| $CClF_2$—$CF_3$ | −38.7 | | | | | 1.29 | | 1.29 | | |
| $CHF_2$—$CClF_2$ | −10.2 | | | | | 1.29 | | 1.29 | | |
| $CHClF$—$CHF_2$ | 17 | | | | | 0.72 | | 0.72 | | |
| $CHClF$—$CH_2F$ | b 25 | | | | | 0.70 | | 0.70 | | |
| $CClF_2$—$CClF_2$ | 3.6 | | | | | 17.94 | | 17.94 | | |
| $CHClF$—$CClF_2$ | 28.2 | | | | | 20.98 | | 20.98 | | |
| $CClF_2$—$CH_2Cl$ | 46.8 | | | 3.81 | | 6.64 | 3.81 | 2.83 | | |
| $CCl_2F$—$CClF_2$ | 47.6 | | | | | 2.83 | | 2.83 | | |
| $CHClF$—$CHClF$ | 59.0 | | | 14.96 | | 14.96 | 14.96 | | | |
| $CHClF$—$CH_2Cl$ | 75.7 | | | 24.35 | | 24.35 | 24.35 | | | |
| $CH_2Cl$—$CH_2Cl$ a | 83.5 | 50.88 | | 111.40 | | 111.40 | 111.40 | | | |
| $CHCl_2$—$CClF_2$ | 71.9 | | | 2.62 | | 2.62 | 2.62 | | | |
| $CHCl_2$—$CHClF$ | 88–103 | | | 1.73 | | 1.73 | 1.73 | | | |
| $CHCL_2$—$CH_2Cl$ | 113.5 | | | 1.65 | | 1.65 | 1.65 | | | |
| $CCl_2F$—$CCl_2F$ | 92.8 | | | | | | | | | |
| Heavy ends | | | | | | 1.73 | 1.73 | | | |
| Light ends | | | | | | 0.57 | | 0.57 | | |
| $H_2$ | | | | | | | | | 84.88 | |
| $Cl_2$ | | | | | | | | | | 32.04 |
| HF | | | 169.75 | | 33.20 | | | | | |
| HCl | | | | | | | | | | |
| Total | | 50.88 | 169.75 | 160.52 | 33.20 | 211.40 | 162.25 | 49.15 | 84.88 | 32.04 |
| Hydrogen equiv | | 203.52 | | 567.22 | | 600.99 | | 32.04 | | |

See footnotes at end of table.

TABLE I.—Continued

| Component | Boiling point, °C | \multicolumn{9}{c}{Gram moles per hour} |
|---|---|---|---|---|---|---|---|---|---|---|
|  |  | 56 | 60 | 62 | 66 | 68 | 72 | 74 | 54 | 80 |
| CClF$_2$—CF$_3$ | -38.7 | 1.29 | 1.29 | | | | | | | |
| CHF$_2$—CClF$_2$ | -10.2 | | | | | | | | | |
| CHClF—CHF$_2$ | 17 | | | | | | | | | |
| CHClF—CH$_2$F | b 25 | | | | | | | | | |
| CClF$_2$—CClF$_2$ | 3.6 | 19.23 | | 19.23 | 19.23 | | | | | |
| CHClF—CClF$_2$ | 28.2 | | | | | | | | | |
| CClF$_2$—CH$_2$Cl | 48.6 | | | | | | | | | |
| CCl$_2$F—CClF$_2$ | 47.6 | 24.53 | | 24.53 | | 24.53 | 24.53 | | | |
| CHClF—CHClF | 59.0 | | | | | | | | | |
| CHClF—CH$_2$Cl | 75.7 | | | | | | | | | |
| CH$_2$Cl—CH$_2$Cl a | 83.5 | | | | | | | | | |
| CHCl$_2$—CClF$_2$ | 71.9 | | | | | | | | | |
| CHCl$_2$—CHClF | 88-103 | | | | | | | | | |
| CHCl$_2$—CH$_2$Cl | 113.5 | | | | | | | | | |
| CCl$_2$F—CCl$_2$F | 92.8 | 3.53 | | 3.53 | | 3.53 | | 3.53 | | |
| Heavy ends | | | | | | | | | | 1.73 |
| Light ends | | 0.57 | 0.57 | | | | | | | |
| H$_2$ | | | | | | | | | | |
| Cl$_2$ | | | | | | | | | | |
| HF | | | | | | | | | | |
| HCl | | | | | | | | | 32.04 | |
| Total | | 49.15 | 1.86 | 47.29 | 19.23 | 28.06 | 24.53 | 3.53 | 32.04 | 1.73 | a Feedstock.
b Estimated.

NOTE.—H eq. converted=169.75=22% per pass (on basis of fresh feed); Faradays required=339.50=9100 amp-hrs×8 volts=72.8 k.w.h. at 100% current eff. (on basis of fresh feed); Anode area required C 250 A./ft.$^2$=36.5 ft.$^2$ (on basis of fresh feed).

Referring to the above Table I, it will be noted that utilization of the chlorination step facilitates the recovery of the principal products by reducing the products to be separated from seven to four in number when one considers that the 1,1-difluorotetrachloroethane and the 1,1-difluoro-1,2,2-trichloroethane are removed together and used as one product. The widespread boiling points of the other products make an easy separation by fractional distillation possible.

The data in said Table II show that the chlorination of the precursors 1-chlorotetrafluoroethane, 1-chloro-1,2,2-trifluoroethane, and 1-chloro-1,2-difluoroethane reduces the production of the generally undesirable product chloropentafluoroethane and increases the production of the more valuable products 1,1,2-trichloro-1,2,2-trifluoroethane and 1,2-dichlorotetrafluoroethane. If said precursors were not chlorinated in accordance with the invention, they would be fluorinated upon recycle to the cell to the undesirable product chloropentafluoroethane.

Said 1,1,2-trichloro-1,2,2-trifluoroethane can be used as a valuable specialty solvent, e.g., a degreasing solvent in the aerospace industry. It can also be used to produce trichlorofluoromethane and dichlorodifluoromethane by chlorinolysis, i.e., cracking or splitting in the presence of chlorine by methods known in the art. Said trichlorofluoromethane and said dichlorodifluoromethane can be used as refrigerants and as aerosol propellants. Said 1,2-dichlorotetrafluoroethane can be used as a refrigerant or as an aerosol propellant. It can also be used to produce dichlorodichloromethane by cracking or splitting in the presence of chlorine. Said 1,1-difluorotetrachloroethane can be used similarly to produce trichlorofluoromethane.

EXAMPLE II

In this illustrative embodiment a run is carried out for the electrochemical fluorination of chloromethane in a system embodying the essential features of the system illustrated in the drawing and described above in Example I. The operating conditions used were substantially the same as those used in the embodiment described in Example I except for minor variations due to the differences in charging stocks. Fresh chloromethane feedstock is introduced via conduits 26 and 28 into the pores of anode 14. A cell effluent stream is withdrawn via conduit 30 and processed as described above in connection with the drawing for the recovery of products therefrom, and the return of a recycle stream to the cell via conduits 82 and 28. Table II below sets forth the principal components in said cell effluent and said recycle streams, the charge and products from the chlorination step, and a material balance for the system.

TABLE II

| Component | B.P., °C | \multicolumn{22}{c}{Gram moles per hour} |
|---|---|---|---|---|---|---|---|---|---|---|---|---|---|---|---|---|---|---|---|---|---|---|---|
|  |  | 26 | 42 | 30 | 40 | 38 | 44 | 48 | 52 | 54 | 56 | 60 | 62 | 66 | 68 | 72 | 74 | 76 | 82 | 80 | 92 | 96 | 94 |
| CF$_4$ | -128 | | | 3 | | | 3 | 3 | | 3 | 3 | | | | | | | | | | | | |
| CHF$_3$ | -82 | | | 5 | | | 5 | 5 | | | | | | | | | | | | | | | |
| CClF$_3$ | -81.4 | | | 5 | | | 5 | 5 | | 10 | | 10 | 10 | | | | | | | | | | |
| CH$_3$F | -78.5 | | | 7 | | | 7 | 7 | | | | | | | | | | | | | | | |
| CH$_2$F$_2$ | -51.7 | | | 8 | | | 8 | 8 | | | | | | | | | | | | | | | |
| CHClF$_2$ | -40.8 | | | 15 | | | 15 | 15 | | | | | | | | | | | | | | | |
| CCl$_2$F$_2$ | -29.8 | | | 3 | | | 3 | 3 | | | | | 26 | | 26 | | 26 | 26 | | | | | |
| CH$_3$Cl a | -24.0 | 55 | | 20 | | | 20 | | | | | | | | | | | | | 20 | 20 | | |
| CH$_2$ClF | -9.1 | | | 20 | | | 20 | | | | | | | | | | | | | 20 | 20 | | |
| CHCl$_2$F | 8.9 | | | 5 | | | 5 | | | | | | | | | | | | 5 | 5 | | | |
| CCl$_3$F | 23.8 | | | 2 | | | 2 | | | | | | 7 | 7 | 7 | | 7 | 2 | | 2 | 2 | 9 | |
| CH$_2$Cl$_2$ | 40 | | | 4 | | | 4 | | | | | | | | | | | 4 | | 4 | | | 4 |
| CHCl$_3$ | 61.2 | | | 2 | | | 2 | | | | | | | | | | | 2 | | 2 | | | 2 |
| CCl$_4$ | 76.8 | | | 1 | | | 1 | | | | | | | | | | | 1 | | 1 | | | 1 |
| H$_2$ | | | | | 64 | 64 | | | | | | | | | | | | | | | | | |
| HF | | | 128 | | 12 | 12 | | | | | | | | | | | | | | | | | |
| Cl$_2$ | | | | | | | | | | | | 57 | | | | | | | | | | | |
| HCl | | | | | | | | | | | | | 57 | | | | | | | | | | |
| Total | | 55 | 128 | 176 | 12 | 64 | 100 | 46 | 57 | 57 | 46 | 3 | 43 | 10 | 33 | 26 | 7 | 54 | 45 | 9 | 2 | 9 | 7 | a Feedstock.

Referring to the above Table II, it will be noted that utilization of the chlorination step reduces the number of products to be recovered in recovering the principal products of the process from seven to four in number. The widely spaced boiling points of said four products makes an easy separation by fractional distillation possible.

The data in Table II show that the chlorination of the precursors trifluoromethane, difluoromethane, and monofluoromethane reduces the production of the undesirable product tetrafluoromethane, and increases the production of trichlorofluoromethane, dichlorodifluoromethane, and monochlorotrifluoromethane. If said precursors were not chlorinated in accordance with the invention, they would be fluorinated upon recycle to said undesirable product tetrafluoromethane. Said trichlorofluoromethane and said dichlorodifluoromethane are valuable for use as refrigerants and as aerosol propellants. Said monochlorotrifluoromethane is valuable for use as a refrigerant in large multistage refrigeration systems.

While the invention has been described with particular reference to using monochloromethane and 1,2-dichloroethane as the feedstocks to the electrochemical fluorination cell, the invention is not so limited. Other chloromethanes and other chloroethanes can also be used. As will be understood by those skilled in the art in view of this disclosure, chlorinated propanes and chlorinated butanes, and other chlorinated higher hydrocarbons, can also be used as feedstocks to the electrochemical fluorination cell.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. A process for the recovery of, and the separation of, perhalogenated fluorocarbon compounds containing a halogen other than fluorine present in a mixture with partially halogenated fluorohydrocarbon compounds which also contain said other halogen and at least some of which are capable of being halogenated to said perhalogenated fluorocarbon compounds, which process comprises: passing said mixture to a halogenation zone; in said halogenation zone, halogenating said partially halogenated fluorohydrocarbon compounds with said halogen other than fluorine to convert same to perhalogenated fluorocarbon compounds so as to reduce the number of compounds present in said mixture; and fractionating the resulting mixture to separate and recover said perhalogenated fluorocarbon compounds.

2. A process according to claim 1 wherein said halogen other than fluorine is chlorine.

3. A process according to claim 2 wherein said first-mentioned mixture comprises at least a portion of an effluent stream from an electrolytic cell wherein a chlorinated hydrocarbon feedstock has been partially fluorinated to produce said mixture.

4. In a process for the fluorination of a halogenated hydrocarbon feedstock wherein there is produced a mixture of perhalogenated fluorocarbon compounds containing a halogen other than fluorine and partially halogenated fluorohydrocarbon compounds also containing said halogen other than fluorine, and wherein said perhalogenated fluorocarbons are recovered from said mixture, the improvement comprising: passing at least a portion of said mixture to a halogenation zone; in said halogenation zone, halogenating said partially halogenated fluorohydrocarbons with said halogen other than fluorine to convert same to perhalogenated fluorocarbon compounds so as to reduce the number of compounds present in said mixture; and fractionating an effluent stream from said halogenation zone to separate and recover said perhalogenated fluorocarbon compounds.

5. A process according to claim 4 wherein: said fluorination process comprises an electrochemical process carried out in an electrolytic cell containing an electrolyte comprising essentially anhydrous liquid hydrogen fluoride and provide with a cathode and an anode; said feedstock is passed into said cell and into contact with said anode and at least a portion thereof is fluorinated to produce said mixture; an effluent stream comprising said mixture is withdrawn from said cell; said effluent stream is fractionated to recover an overhead stream comprising perhalogenated fluorocarbon compounds and partially halogenated fluorohydrocarbon compounds and a bottoms steam comprising partially halogenated fluorohydrocarbons; and said overhead stream is passed to said halogenation zone.

6. A process according to claim 5 wherein at least a portion of said bottoms stream is recycled to said cell as a portion of the feedstock thereto.

7. A process according to claim 5 wherein: the halogen in said feedstock is chlorine; and said halogen other than fluorine is also chlorine.

8. A process according to claim 7 wherein: said feedstock is 1,2-dichloroethane; said overhead stream comprises chloropentafluoroethane, 1 - chloro - 1,1,2,2-tetrafluoroethane, 1,2 - dichlorotetrafluoroethane, 1-chloro-1,2,2 - trifluoroethane, 1 - chloro - 1,2-difluoroethane, 1,2 - dichloro - 1,2,2 - trifluoroethane, 1,2-dichloro-1,1-difluoroethane, and 1,1,2-trichloro-1,2,2-trifluoroethane; and said perhalogenated fluorocarbon compounds recovered from said effluent stream from said halogenation zone includes at least one of chloropentafluoroethane, 1,2 - dichlorotetrafluoroethane, 1,1,2 - trichloro-1,2,2-trifluoroethane, and 1,2-difluorotetrachloroethane.

9. A process according to claim 7 wherein: said feedstock is monochloromethane; said overhead stream comprises tetrafluoromethane, trifluoromethane, chlorotrifluoromethane, monofluoromethane, difluoromethane, monochlorodifluoromethane, and dichlorodifluoromethane; and said perhalogenated fluorocarbon compounds recovered from said effluent stream from said halogenation zone includes at least one tetrafluoromethane, monochlorotrifluoromethane, dichlorodifluoromethane, and trichlorofluoromethane.

References Cited
UNITED STATES PATENTS

| | | | |
|---|---|---|---|
| 2,436,135 | 2/1948 | Barrick et al. | 260—694 |
| 2,716,140 | 8/1955 | McBee et al. | 260—694 |
| 2,571,901 | 10/1951 | Lawlor | 260—694 |
| 3,047,639 | 7/1962 | Cunningham et al. | 260—648 F |
| 3,456,024 | 7/1969 | Loree | 204—163 X |
| 3,211,636 | 10/1965 | Manno et al. | 204—163 |

HOWARD S. WILLIAMS, Primary Examiner

U.S. Cl. X.R.

204—163 R, 163 HE; 260—648 F, 694